(12) United States Patent
Gyllenhammar

(10) Patent No.: US 6,243,992 B1
(45) Date of Patent: Jun. 12, 2001

(54) ARRANGEMENT OF A MOBILE ACCOMMODATION

(76) Inventor: Thorbjörn Gyllenhammar, Borgargatan 6, S-117 34, Stockholm (SE)

( * ) Notice: Subject to any disclaimer, the term of this patent is extended or adjusted under 35 U.S.C. 154(b) by 0 days.

(21) Appl. No.: 09/254,564

(22) PCT Filed: Sep. 5, 1997

(86) PCT No.: PCT/SE97/01481

§ 371 Date: Apr. 19, 1999

§ 102(e) Date: Apr. 19, 1999

(87) PCT Pub. No.: WO98/10954

PCT Pub. Date: Mar. 19, 1998

(30) Foreign Application Priority Data

Sep. 6, 1996 (SE) .................................................. 9603266

(51) Int. Cl.[7] ............................. E04B 1/346; E04B 7/16
(52) U.S. Cl. ..................... 52/64; 52/66; 52/68; 52/69; 296/26.05; 296/26.09; 296/26.13
(58) Field of Search ................................ 52/66, 67, 68, 52/69, 143; 296/26.03, 26.08, 26.09, 26.1, 26.11, 26.12, 26.13, 26.14, 26.15

(56) References Cited

U.S. PATENT DOCUMENTS

| | | | |
|---|---|---|---|
| 3,226,890 | * | 1/1966 | Flajole ....................................... 52/66 |
| 3,234,696 | * | 2/1966 | Spencer ..................................... 52/66 |
| 3,714,746 | * | 2/1973 | Barlow ...................................... 52/66 |
| 4,074,475 | * | 2/1978 | Wahlquist ................................ 52/143 |
| 4,603,518 | * | 8/1986 | Fennes ...................................... 52/66 |
| 5,815,988 | * | 10/1998 | Molina .................................... 52/666 |

* cited by examiner

*Primary Examiner*—Carl D. Friedman
*Assistant Examiner*—Kevin McDermott
(74) *Attorney, Agent, or Firm*—Frishauf, Holtz, Goodman, Langer & Chick, P.C.

(57) ABSTRACT

An expandable and collapsible mobile structure is provided that includes a central structure having a floor, a roof, front and rear end walls, and at least one longitudinal side wall that is movable out from the central structure. Foldable floor sections are hinged to a bottom edge of the longitudinal side wall and a bottom edge of the central structure, and foldable roof sections are hinged to a top edge of the longitudinal side wall and a top edge of the central structure. The foldable floor sections and foldable roof sections are adapted to be unfolded as the longitudinal side wall is moved out from the central structure. And front and rear side walls are hinged to respective outermost side edges of the front and rear end walls of the central structure. In an expansion operation, the front and rear side walls are adapted to be initially swung out perpendicular to the longitudinal side wall and positioned by ground supports. The top and bottom portions of inner sides of the front and rear side walls, moreover, are provided with rails, and top and bottom portions of front and rear side edges of the longitudinal side wall are provided with respective guide members which are movably journalled on the rails.

6 Claims, 2 Drawing Sheets

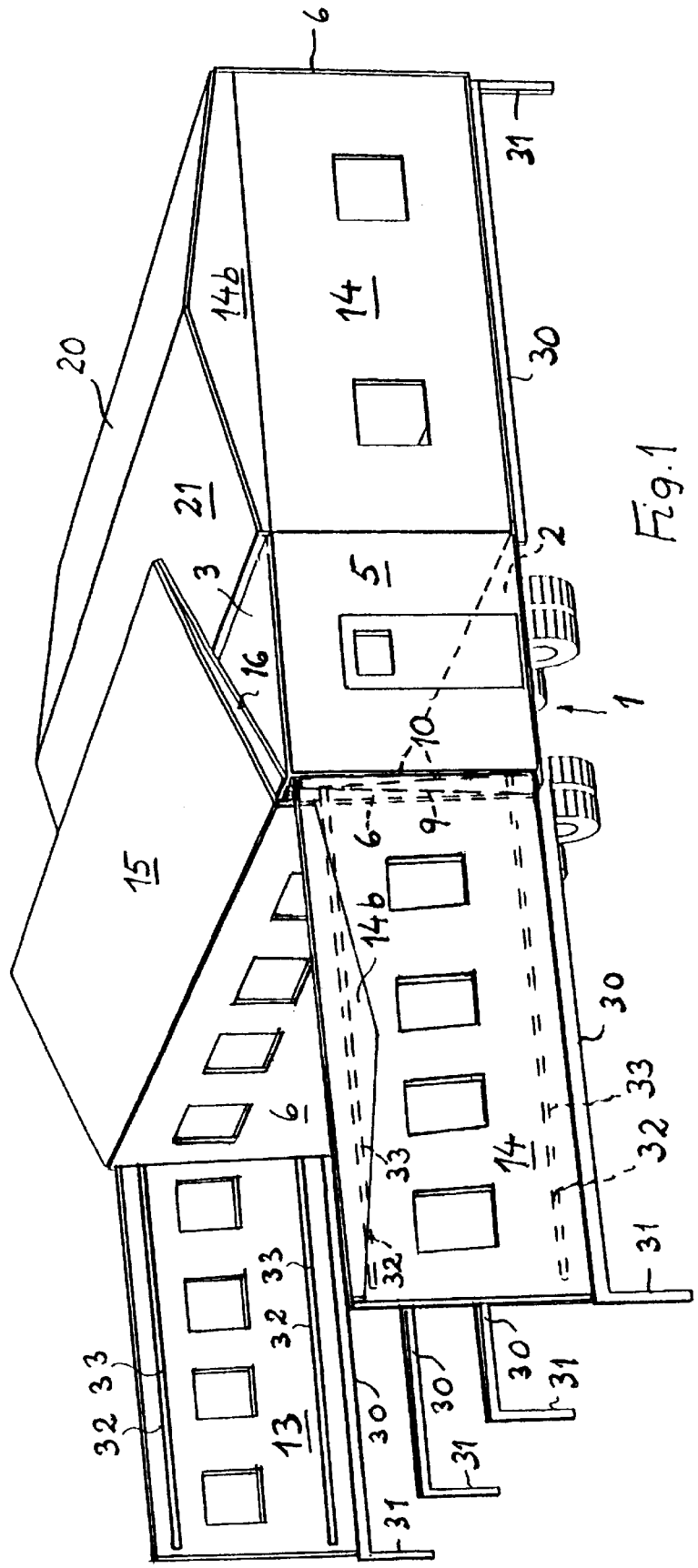

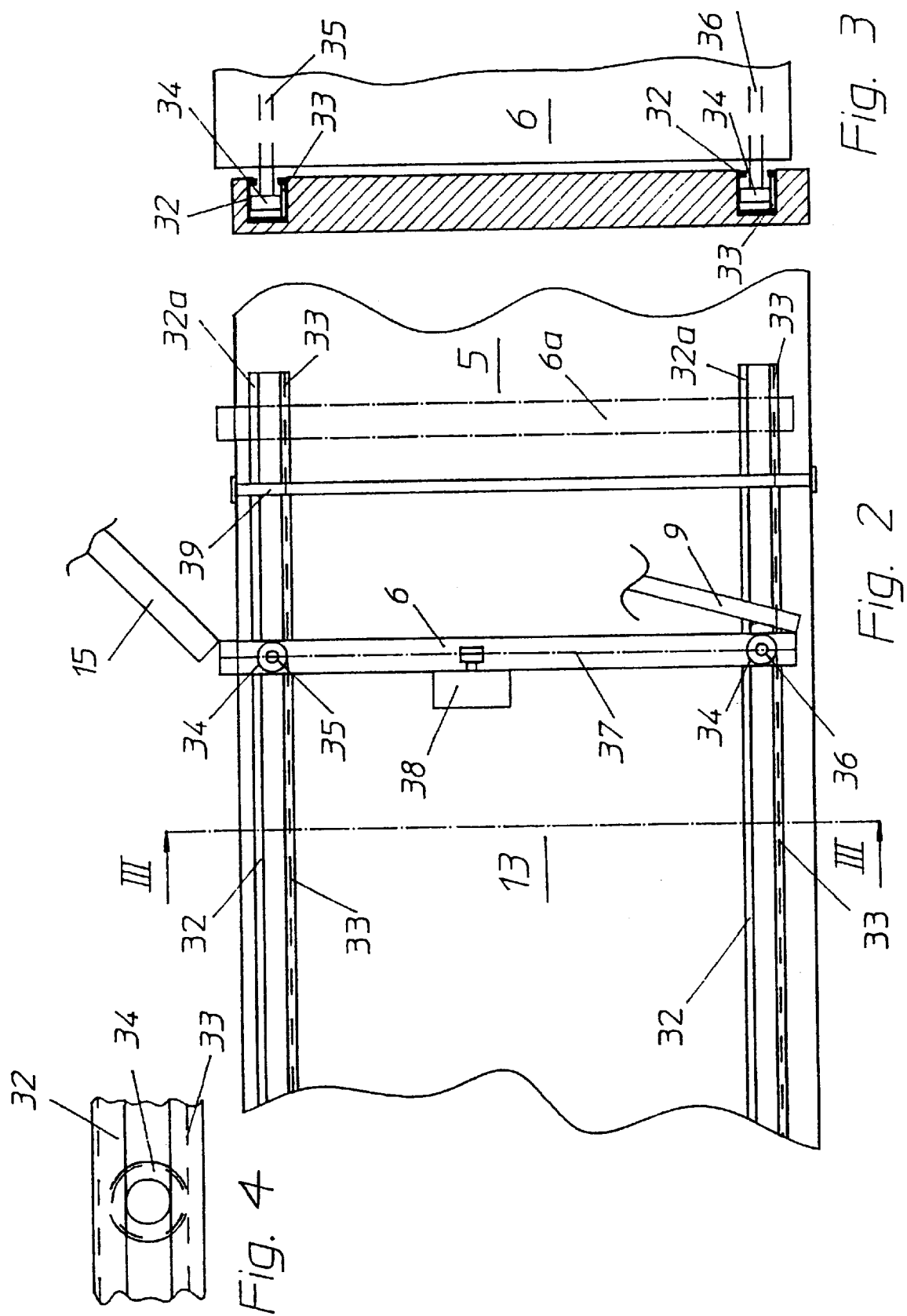

ARRANGEMENT OF A MOBILE ACCOMMODATION

BACKGROUND OF THE INVENTION

The present invention relates to an arrangement of a mobile accomodation which comprises (i) a central structure having a floor, a roof, front and rear end walls, and at least one longitudinal side wall that is movable out from the central structure; (ii) foldable floor and roof sections that are hinged to edges of the longitudinal side wall and edges of the central structure and that are adapted to be unfolded as the longitudinal side wall is moved out from the central structure, and (iii) front and rear side walls hinged to the side edges of the front and rear end walls of the central structure and adapted to be swung out perpendicular to the longitudinal side wall of the central structure.

Mobile accomodations of activities of this kind are previously known from Swedish patent 9403670-4. It has become apparent in practical use that the movement of the longitudinal side walls may involve hard stresses of exposed parts and hinges. This is the case particularly in windy weather conditions because the roof sections that are folded upwards during the movement of the longitudinal side walls can catch a great deal of wind.

OBJECT OF THE INVENTION

The object of the invention is to achieve an arrangement of a mobile accomodation in which the disadvantage mentioned above is eliminated.

This is achieved according to the invention in that in an expansion operation, the front and rear side walls are adapted to be initially swung out perpendicular to the longitudinal side wall and positioned by ground supports, and in that top and bottom portions of inner sides of the front and rear side walls are provided with rails, and top and bottom portions of front and rear side edges of the longitudinal side wall are provided with respective guide members which are movably journalled on the rails. Due to the fact that the front and rear side walls can be swung out and secured against the ground initially, a strong stabilization is achieved of the longitudinal side wall during its movement outwards. This is obtained by both ends of said side wall being provided each with two guide members running along rails or similar members attached to the top and bottom portions of the two front and rear side walls. The movable, longitudinal side wall is positively controlled such that the side wall is never obliquely positioned. This is achieved by using a driving unit that moves the guide members synchronously outwards and back.

According to a preferred embodiment of the invention each guide means comprises a driven pinion that runs meshing with a rack rail surface of each rail.

BRIEF DESCRIPTION OF DRAWINGS

The invention is further described in the following description with reference to the accompanying drawings which schematically illustrate an embodiment of an arrangement according to the invention, and in which FIG. 1 is an isometric view of a mobile accomodation of activities during expansion, FIG. 2 is a side view of the front side wall shown in FIG. 1 with rails attached to the inner side of the wall, the rear side wall and the rear end wall of the central structure being omitted for the sake of clarity, FIG. 3 is a cross-section of the side wall in FIG. 2 along line III—III in FIG. 2, and FIG. 4 is a side view of a guide means with accompanying rail.

DETAILED DESCRIPTION

The embodiment shown in FIG. 1 of a mobile accomodation comprises a central structure 1 with floor 2 and roof 3. A longitudinal side wall 6 extends along each open longitudinal side of the central structure, which side walls are movable outwards and have bottom edges attached to the bottom edges of the central structure via two upwards folded hinged floor sections 9,10. The top edge of the side wall 6 and the adjacent top edge of the central structure 1 are attached to two mutually hinged roof sections 15,16, which are folded upwards and, when the side wall 6 is moved close to the central structure 1, are double folded and positioned on the roof 3 of the central structure. In the folded condition the roof sections 15,16 rest on the roof 3, and the roof sections 20,21 of the other part—shown already unfolded FIG. 1—rest in folded condition on the roof section 15. The floor sections 9,10 and the side wall 6 are in completely folded condition positioned within the side edges of the front and rear end walls 5. Therefore the front and rear side walls 13,14 in folded position can be positioned one outside the other along the outside of the side wall 6 or both along the outside of the side wall 6 if the length of the side walls 13,14 of the same length is shorter than half the length of the side wall 6.

Here the shown mobile accomodation according to the invention differs from the accomodation known from the Swedish patent 9403670-4, that has the corresponding front and rear side walls positioned within the floor sections 9,10 joined to the central structure 1 for folding out said side walls when the longitudinal side wall, the floor sections and the roof sections have been moved, in place in completely folded out condition.

A specific new feature of the invention is that in a first step the side walls 13,14 are folded out perpendicular to the longitudinal direction of the central structure and are secured against the ground by adjustable ground supports 31 attached directly to the bottom edges of the side walls 13,14 or to a beam 30 extending along said bottom edges. Two further beams 30 with ground supports 31 are attached perpendicular to the central structure 1 for supporting the floor to be folded out. The upper parts of the side walls 13,14 have triangular parts 14b, which by folding up from the shown positions form a support for the floor to be folded out. Then, in a second step the side wall 6 is moved outwards, and for that purpose the top and bottom portions of the side walls 13,14 are provided with rails 32 secured to and recessed in the inner sides of the side walls and having the shape shown in FIG. 2 and 3. The interior bottom surface of the rails has the shape of a rack rail 33 on which a pinion 34 enclosed by the rail can roll meshing with the rack rail 33. Four pinions 34 positioned in a common vertical plane are rotatably journalled at the top and bottom of each side edge of the side wall 6. The top pair of the pinions are driven by a common shaft 35, and the bottom pair are driven by another common shaft 36. Shafts 35 and 36 are driven in a synchronized manner by a connection shaft 37, at both ends provided with worm pinions driving the pinions 34. An electric motor 38 is arranged to drive the shaft 37 by means of a worm pinion.

The side wall 6 is in completely retracted condition located in the position marked 6a in the central structure 1. This means that the rails 32 have to extend past the hinge 39 connecting each side wall 13,14 and the front and rear end walls 5 of the central structure by a rail section 32a. By starting the motor 38 with the wall 6 in the position 6a the pinions 34 will roll over to the rails 32 and keep the wall 6 firmly in vertical position until the wall 6 has arrived to its completely protruded position. At the same time the roof sections 15,16 have been pressed upwards and then to their final positions marked 20,21 and the floor sections 9,10 have been unfolded down to a plane position on the beams 30. As mentioned above rather heavy wind forces can occur affecting the different parts and especially the upright roof sections. These wind forces will cause no problems thanks to the rigid anchoring of the roof section 15 to the folded out side walls 13,14. In case of extreme wind conditions the both expandable parts on each side of the central structure can be expanded at the same time such that a balancing of the wind forces acting on the moving parts is obtained that during the expanding operation.

The invention is of course not restricted to the embodiment shown and described above but may be modified in different ways within the scope of the inventive idea defined by the claims. This is the case especially with reference to the measures for moving the longitudinal side wall 6 guided by the rails 32. As an alternative for rack rail surfaces in the rails and cooperating pinions in the rails, rails with smooth bottom surfaces and conventional rolls in the rails may be used, in which case the side wall 6 has to be moved by means of another actuating mechanism, for instance hydraulic pistons or driving chains, which also may fulfill a synchronizing function. The shown driving arrangement with pinions is suitable, however, with respect to the crossing of the joints 39.

What is claimed is:

1. An expandable and collapsible mobile structure comprising:
   a central structure having a floor, a roof, front and rear end walls, and at least one longitudinal side wall that is movable out from the central structure;
   foldable floor sections hinged to a bottom edge of the longitudinal side wall and a bottom edge of the central structure, and foldable roof sections hinged to a top edge of the longitudinal side wall and a top edge of the central structure, said foldable floor sections and foldable roof sections being adapted to be unfolded as the longitudinal side wall is moved out from the central structure; and
   front and rear side walls hinged to respective outermost side edges of the front and rear end walls of the central structure;
   wherein in an expansion operation, the front and rear side walls are adapted to initially swung out perpendicular to the longitudinal side wall and positioned by ground supports; and
   wherein top and bottom portions of inner sides of the front and rear side walls are provided with rails, and top and bottom portions of front and rear side edges of the longitudinal side wall are provided with respective guide members which are movably journalled on said rails.

2. The structure according to claim 1, further comprising a driving unit that is adapted to move the guide members synchronously in the rails both out from and back towards the central structure.

3. The structure according to claim 1, wherein the rails comprise rack rail surfaces, and the guide members each comprise a driven pinion arranged to mesh with the rack rail surfaces.

4. The structure according to claim 2, wherein the rails comprise rack rail surfaces, and the guide members each comprise a driven pinion arranged to mesh with the rack rail surfaces.

5. An expandable and collapsible mobile structure comprising:
   a central structure having a floor, a roof, and front and rear end walls;
   front and rear side walls attached to outermost ends of the central structure and adapted to be swung between an open and a closed position; and
   a foldable roof and a foldable floor that are adapted to be opened when the front and rear side walls are in the open position;
   wherein top and bottom portions of the front and rear side walls are provided with rails that are adapted to accommodate respective guide members which are moved along the rails as the foldable roof and foldable floor are opened and closed.

6. The structure according to claim 5, further comprising a longitudinal side wall hinged at top and bottom portions thereof to outer ends of the foldable roof and foldable floor, respectively, and wherein the guide members are provided on the longitudinal side wall.

\* \* \* \* \*